(No Model.)
J. J. & J. F. DAVET.
STRADDLE ROW HAND CULTIVATOR.
No. 543,178. Patented July 23, 1895.
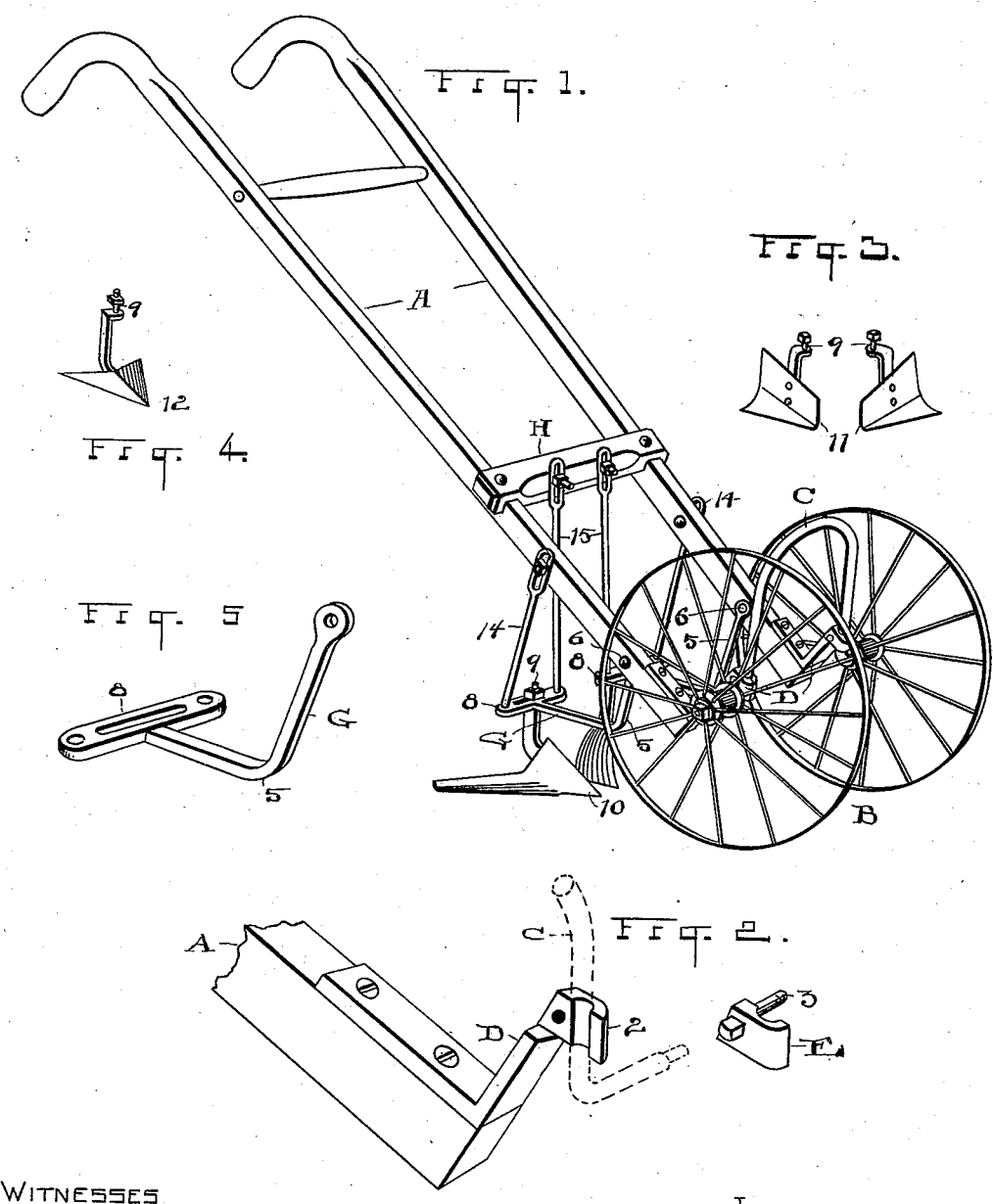
WITNESSES
Dr. B. Moser
N. M. Thomas
INVENTORS
Joseph J. Davet
Julius F. Davet
By H. J. Fisher.
ATTORNEY

UNITED STATES PATENT OFFICE.

JOSEPH J. DAVET AND JULIUS F. DAVET, OF NORTH MADISON, OHIO.

STRADDLE-ROW HAND-CULTIVATOR.

SPECIFICATION forming part of Letters Patent No. 543,178, dated July 23, 1895.

Application filed April 11, 1895. Serial No. 545,302. (No model.)

*To all whom it may concern:*

Be it known that we, JOSEPH J. DAVET and JULIUS F. DAVET, citizens of the United States, residing at North Madison, in the county of Lake and State of Ohio, have invented certain new and useful Improvements in Straddle-Row Hand-Cultivators; and we do hereby declare that the following is a full, clear, and exact description of the invention, which will enable others skilled in the art to which it appertains to make and use the same.

Our invention relates to straddle-row hand-cultivators; and the invention consists in the construction of a cultivator for hand use and adapted to work both sides of a row at the same time, and which is supported on wheels and has its working parts adjustable laterally and in respect to elevation, all said parts constructed and combined substantially as shown and described, and particularly pointed out in the claims.

In the accompanying drawings, Figure 1 is a perspective view of our improved cultivator with all the parts in working position. Fig. 2 is an enlarged perspective view of the front portion of one of the handle-bars and showing the two-part clamp by which the said bar is adjustably fixed upon the arched axle. Figs. 3 and 4 show different styles of scrapers or shovels which may be used with this cultivator, and still others might be shown if necessary. Fig. 5 is a perspective view of one of the drag-bars.

A represents the handle-bars and B the wheels of the cultivator. These parts are connected and supported by an arched axle C, and the said handle-bars are fixed to the perpendicular portion of the said axle by means of the two-part clamp D and E. The bracket part D is substantially L-shape, with its long stem bolted to the bar A and having at the terminus of its short stem half-clamp portion 2, the other section of the clamp being shown at E. The bolt 3 serves to firmly fix these clamps together on the axle C and thereby secure the said handle bar or bars in any adjustable position.

The drag-bars G have the shape shown most distinctly in Fig. 5, where it will be seen that they are bent substantially at right angles with the elbow 5 about midway of their length, and are perforated at their front ends to be attached by a bolt 6 or the like to the inside of the handle-bar. These extremities may be slotted if preferred; but I depend upon the adjustment of the handle-bars on the axle C for the raising or the lowering of the front ends of the drag-bars and which adjustment also serves to set the depth of the plows or scrapers. At the rear the said drag-bars have transverse portions 8, which are slotted longitudinally to receive the shank 9 of the plow or scraper secured therein by means of a nut, as here shown. All the necessary lateral adjustment of the plow or scraper is effected in these slots, and I may attach and use the scraper 10, as shown herein, or the scraper 11, Fig. 3, or the cultivator 12, Fig. 4, or other implement. At the extremities of the transverse part 8 of the drag-bars are rods 14 and 15, respectively, slotted at their upper ends, and the rods 14 are engaged to the handle-bar, as here shown, and the rods 15, which are the inside rods, are engaged to the cross-piece H which connects the handle-bars. These rods serve to further assist in setting the plows or scrapers as to depth of operation, but are more specially designed to adjust the handles higher or lower with respect to the plows, according to height of the person using the implement. All adjustments front and rear will be made accordingly and according to depth of cultivation.

One of the great advantages in this construction of cultivator is its light running and easy work. The wheels carry practically all the load, and this results from the peculiar arrangement of the handle-bars at the front, to which the cultivators or plows are attached. The angle-pieces D are purposely so made and arranged as to bring their front ends below the spindles of the wheels and thereby make the wheels carry the load. This throws the weight and the work on the wheels and makes the pushing much easier than when the handle-bars come to or above the spindles. In the ordinary hand-cultivator one has to push the whole machine and the plows in the ground all the time. By directing the push beneath the spindles there is an upward lifting tendency all the time, which materially lightens the push. Again, by this construction the row of plants is exposed to view in front of and about the shovels and the machine is all open inside so as to see how to work and what is being done.

What we claim is—

1. In a hand cultivator, an arched axle having the spindles starting immediately from the base of the arch, in combination with the handle bars and brackets fixed to said bars and provided with clamps engaging the vertical side portions of the arch, whereby the handle bars are adjusted up or down at their forward ends, substantially as set forth.

2. In a hand cultivator, an arched axle and a pair of handle bars, a substantially L-shaped bracket for each bar provided with a clamp at its upper end and engaged upon said axle near the wheel spindle whereby the said handle bars are brought below the plane of the wheel spindles, substantially as set forth.

3. In a hand cultivator, a pair of handle bars, an arched axle, and a drag bar pivoted to each handle bar, said drag bar bent to form an elbow substantially midway of its length and having transverse slotted portion —8— rigid therewith at its rear, and supporting rods therefor, substantially as set forth.

4. The hand cultivator described having a pair of hand bars supported with their front ends below the wheel spindles, a pair of drag bars pivoted on said hand bars near their front ends and bent to form horizontal portions, and having slotted cross bars —8— at their rear and adjustable supporting rods, substantially as set forth.

5. The combination of the arched axle, the handle bars and the right angled clamp brackets by which the said bars are secured to the said axle, in combination with the elbow shaped drag bars pivoted on said handle bars and having the transverse portion —8— at their rear, the cultivator shovel or scraper, and the slotted supporting rods fixed to the said parts —8— and attached to the handle frame, substantially as set forth.

Witness our hands to the foregoing specification this 1st day of April, 1895.

JOSEPH J. DAVET.
JULIUS F. DAVET.

Witnesses:
MONROE FALL,
W. A. CORLETT.